March 14, 1939.  N. T. NELSON  2,150,872
EXTENSION DEVICE
Filed Nov. 27, 1936
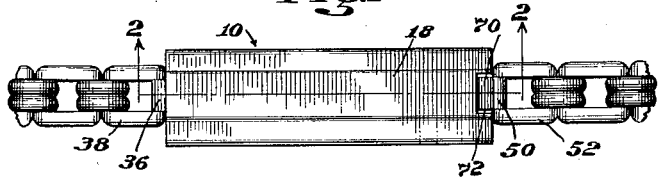
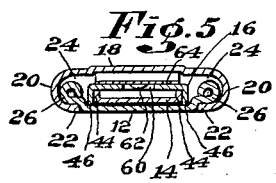
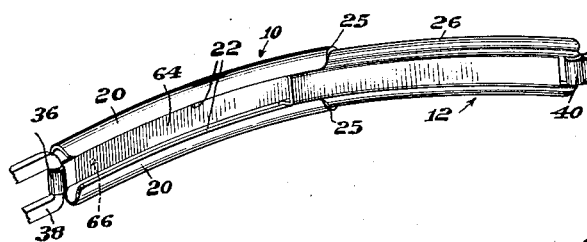
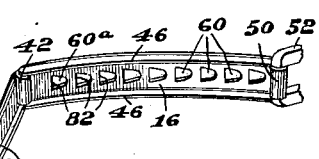
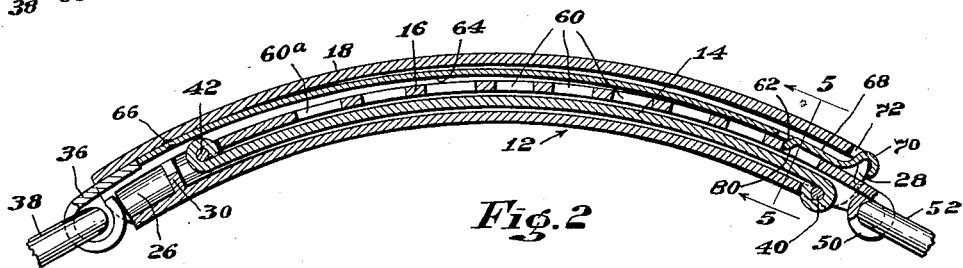
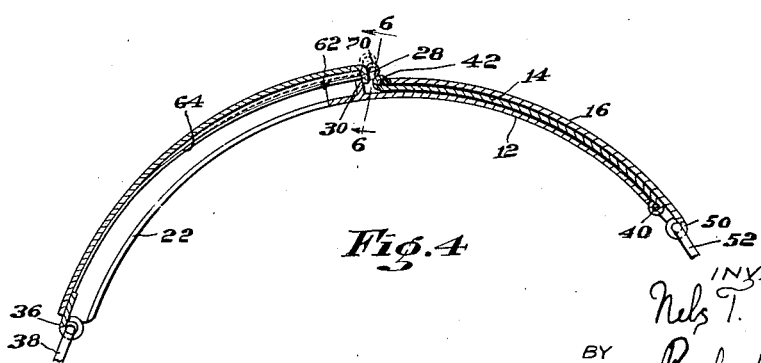
INVENTOR:
Nels T. Nelson
BY Rowland V. Patrick
ATTORNEY Patented Mar. 14, 1939

2,150,872

UNITED STATES PATENT OFFICE 2,150,872

EXTENSION DEVICE

Nels T. Nelson, Attleboro, Mass., assignor to J. F. Sturdy's Sons Company, Attleboro Falls, Mass., a corporation of Massachusetts Application November 27, 1936, Serial No. 112,844

5 Claims.  (Cl. 24—71)

My invention relates to fastening devices of the type employed with articles adapted for wrist wear, and more particularly to that type of fastening device which is known as an extension device, and which, when incorporated in a wrist-encircling article, allows attachment of the article to the wrist and removal therefrom by ready passage over the hand, without detaching the ends of the article.

It is an object of my invention to provide an extension device which is compact, sturdy, and durable, yet includes necessary mechanism for precise adjustment of the device in fastened position, according to the demands of the individual wearer. Thus, my device includes a number of foldable members, providing, in extended position, a length sufficient for ready passage of the article over the hand. In addition, my device has provision for a sliding length adjustment after the foldable members have been brought into folded relationship, including a housing member adapted for slidably receiving the folded members, and locking means adapted to hold the folded members in a plurality of selective positions relative to the housing member, the locking means being operative to allow adjustment of the device freely by a shortening movement, yet preventing a lengthening movement thereof except upon manual disengagement of the locking means.

The details of my preferred construction may be readily understood by reference to the accompanying drawing, in which Fig. 1 is a plan view of my device in one of several fastened positions;

Fig. 2 is an enlarged cross-section on the line 2—2 of Fig. 1;

Fig. 3 is a bottom perspective view of my device in extended position;

Fig. 4 is a cross-sectional view showing my device in partially extended position, and showing in dotted lines, the disengaging position of my locking means;

Fig. 5 is a cross-section taken on the line 5—5 of Fig. 2;

Fig. 6 is a cross-section on the line 6—6 of Fig. 4.

Referring to Fig. 3, my device is constructed of a number of individual members or sections, which may be longitudinally arcuate to conform to the shape of the wrist and thereby provide a snug fit. These sections include a housing member 10, and a plurality of foldable members, including a supporting member 12, an intermediate member 14, and an end, or, in the embodiment shown, an engaging, member 16.

The housing member 10 and supporting member 12 are arranged for sliding engagement with each other. For this purpose, housing member 10 is provided with a top wall 18 and side walls, 20, 20, which are infolded towards each other along their bottom edges 22, 22, as clearly illustrated in Figs. 3 and 5, to provide longitudinal channels 24, 24, as shown in Fig. 5, which are open at least at one end 25, 25, as shown in Fig. 3.

Supporting member 12, as shown in Fig. 5, has edge portions which are extended upwardly and outwardly, and are longitudinally rolled or bent inwardly to provide longitudinal beads 26, 26, adapted to be received in channels 24, 24, of housing member 10, to permit relative sliding movement of the members 10 and 12.

To prevent separation of supporting member 12 from its sliding engagement with housing member 10, cooperating stop means may be provided on the respective members. In the embodiment shown, one of the stop means takes the form of a pair of lugs 28, 28, at the open end 25 of housing member 10. As shown in Fig. 6, these lugs 28, 28, are disposed inwardly from the side edges of the housing member, and may be arranged to extend downwardly inside of the respective beads 26, 26 to act, to some extent at least, as guides in the sliding movement of the supporting member 12. The lugs 28, 28 may be integral with the top wall 18 of the housing member 10, and are conveniently formed by providing projections on the top wall which may be bent downwardly into the position shown. To cooperate as stop means with the lugs 28, 28, the supporting member 12 may be provided at its inner end with a laterally extending vertical wall 30. As shown in Fig. 4, this wall 30 may be conveniently set a short distance from the end of supporting member 12, to provide any desired amount of relative support between members 10 and 12 when they are in extended position relative to each other. The wall 30 may be conveniently affixed by inserting the same into slots cut in beads 26, 26, at the desired position. For a purpose later to be described, wall 30 is provided with a central cut-out portion 34, as shown in Fig. 6. Thus, as shown in Fig. 4, as member 12 is slid to the right, or outwardly, the movement is terminated when wall 30 engages lugs 28, 28, thus preventing separation of the members in one direction.

To limit movement of member 12 at the opposite end of housing 10, stop means such as the bent-over ear 36 may be provided. As shown in Fig. 2, ear 36 may be a piece of strip metal attached to the underside of top wall 18, and is adapted to act as a securing means for fastening a link member of the wrist article, such as 38, to the housing 10. At the same time, the ear 36 also acts as an abutment against which sliding member 12 abuts to limit its inward sliding movement.

When sliding member 12 is in extended position relative to the housing member 10, the position shown in Fig. 4, foldable members 14 and 16 are adapted to fold thereon as shown in the following manner. Referring to Fig. 3, intermediate member 14 is hingedly attached to the member 12 in any well known manner, as at 40, and to the member 16, as at 42. Each of members 14 and 16 may be provided with downwardly extending side flanges 44, 44 and 46, 46 respectively, for strengthening purposes, and the members 14 and 16 are of such width that they may be folded upon the supporting member 12 between beads 26, 26, as shown in Fig. 5, with flanges 46, 46 positioned between flanges 44, 44, and beads 26, 26.

The outward end of member 16 is provided with suitable means, such as ear 50, shown in Fig. 3, for securing an opposite end of the wrist article, such as link member 52.

Members 14 and 16 are of such length that when member 12 is in extended position, members 14 and 16 may be folded thereon, as shown in Fig. 4, with the ear 50 extending beyond the end of member 12. As shown, member 14 is sufficiently shorter than member 12 so that, when folded, hinge 42 does not extend to stop member 30, but to a position short of the lugs 28, 28 of housing member 10, when wall 30 abuts lugs 28, 28.

Thus, after members 14 and 16 have been folded on member 12, the group of folded members 12, 14 and 16, may be slid into housing member 10, with lugs 28, 28 riding between heads 26, 26, and flanges 46, 46, until supporting member 12 abuts ear 36. In this position, as shown in Fig. 2, members 14 and 16 are positioned between supporting member 12 and top wall 18 of housing member 10.

In order to secure the folded members in fastened position, I provide locking means which not only secure the members in the position shown in Fig. 1, but also may secure the members in a plurality of adjusted positions, providing a selected longer adjustment than that shown in Fig. 1. To accomplish this, means are provided which allow inward sliding movement of folded members 12, 14 and 16, to a selected position, and there lock the same against outward movement until the locking means are manually disengaged.

Such locking means comprise, in general, one locking member associated with the housing member 10, and a cooperating locking member associated with the foldable members 12, 14 and 16, together with a manually operated disengaging means associated with one of the locking members. In addition, I incorporate with one of my locking members resilient means which allows inward sliding movement of members 12, 14 and 16, without manual operation of the disengaging means, yet prevents outward sliding movement of the same except upon manual operation of the disengaging means to unlock the engaged locking members.

In my preferred embodiment, illustrated in the drawing, the locking member on my foldable members may comprise any well known type of ratchet.

Referring to Fig. 3, I have illustrated a series of apertures 60, associated with member 16. These apertures are of semi-elliptical shape, with the straight edges thereof disposed towards the housing member 10, as shown, for a purpose later to be described.

The cooperating locking means on housing member 10 is illustrated as a pawl 62. Obviously the position of the pawl and ratchet may be reversed. The pawl 62 may be mounted on the underside of the top wall 18 of the housing member 10, and, in my preferred embodiment, it is so mounted as to have a yielding movement upwardly. For this purpose, I associate with the pawl, resilient means which comprises, in this case, a spring member 64, extending longitudinally of the housing member, and on which the pawl 62 is mounted; in fact, the pawl may be conveniently formed by striking the same from the metal of spring member 64. As shown, the spring member 64 is attached to the top wall 18 of housing member 10 at a point 66 remote from the pawl 62, the spring 64 being adapted to hold the pawl end thereof spaced from the top wall 18, as shown in Fig. 2.

As further shown in Fig. 2, the spring member 64 is extended at 68 and bent upwardly at 70 to form a lift tab, and the housing member 10 may be provided at end 25 with a recess 72, as shown in Figs. 1 and 2, through which the tab 70 may pass when it is manually lifted to draw pawl 62 towards the top wall against the resiliency of spring 64 to the position shown in dotted lines in Fig. 4.

Thus pawl 62 is forced into apertures 60 by spring 64 as members 12, 14 and 16 are slid into housing 10, the wall 30 of supporting member 12 not contacting pawl 62 because of its previously described central cut-out portion 34.

In order to allow inward sliding movement of members 12, 14 and 16, without requiring manual lifting of tab 70 to allow apertures 60 to pass under pawl 62, the pawl may be conveniently formed on its outer side with an inclined surface 80 (Fig. 2), which cooperates with the narrowed ends of apertures 60 on member 16, to lift pawl 62 out of apertures 60 against the yielding action of spring 64, as member 16 passes into the housing. Outward movement of the member 16 and attached members 14 and 12, is prevented, however, by pawl 62 engaging one of the straight edges 82 (Fig. 3) of apertures 60, until pawl 62 has been lifted manually by tab lift 70 upwardly out of the path of engaging member 16, and so held until the last aperture 60a has passed out of the housing 10 beyond the pawl 62.

In operation, my device, when incorporated in a closed bracelet device, may be manipulated in the following manner: The device, in extended position, as shown in Fig. 3, is passed over the hand onto the wrist. Engaging member 16 is then folded over the top of supporting member 12 with intermediate member 14 therebetween, to the position illustrated in Fig. 4. Folded members 12, 14 and 16, as a group, may then be slid into the housing 10 until the bracelet is suitably tightened to the wearer's taste, during which movement pawl 62 is forced into successive apertures 60 by the resiliency of spring 64, and rises out of the apertures against such resiliency, as previously described. When the desired tightness has been obtained, the pawl 62 will be forced into the first aperture 60 presenting itself on outward movement, thereby securing the device for all practical purposes at the very point of adjustment. The device will be maintained in this position until, for removal, the pawl 62 is disengaged from the ratchet by lifting tab 70 to the dotted line position shown in Fig. 4, after which disengagement, folded members 12, 14 and 16, may be freely slid to extended position relative to the housing member, with wall 30 engaging lugs 28, 28, whereupon members 14 and 16 may be extended to their full unfolded position, as shown in Fig. 3, to allow removal of the entire article over the hand.

I claim:

1. In an extension device of the character described, a plate section having infolded edge portions, a sliding section having longitudinal edge portions in sliding engagement with said plate section, and held against separation therefrom, a spring arm associated with said plate section and extending longitudinally thereof, pawl and ratchet means mounted on said arm and said sliding section, said means being adapted for cooperative engagement in relative sliding movement of said sections, and a finger piece integral with said spring arm extending from the same end of said plate section as said sliding section, said finger piece being spaced from said plate section and adapted for movement towards the plane of said plate section to move said spring arm against its own resiliency to disengage said pawl and ratchet.

2. In an extension device of the character described, an imperforate housing member, a plurality of foldable members hingedly attached together and adapted to fold one upon another, including a supporting member and an engaging member, said supporting member being in slidable engagement with said housing member and held against separation therefrom, ratchet means on said engaging member, pawl means mounted on said housing member, said housing member slidably receiving at one end thereof said foldable members in folded position with said pawl engaging said ratchet, and means integral with said pawl projecting from the same end of said housing member as said sliding member to disengage said pawl from said ratchet to allow outward movement of said engaging member relative to said housing member, said foldable members being adapted to be extended to unfolded position only when said supporting member is in extended position relative to said housing member.

3. In an extension device of the character described, a housing member, a plurality of foldable members hingedly attached together and adapted to fold one upon another, one of said foldable members being in sliding engagement with said housing member and held against separation therefrom, ratchet means on one of said foldable members, a pawl mounted on said housing member, said housing member slidably receiving said foldable members in folded position with said ratchet engaging said pawl, and a lift tab integral with said pawl projecting from the same end of said housing member as said folded members to disengage said pawl from said ratchet to allow outward movement of said folded members relative to said housing member, said foldable members being adapted to be extended to unfolded position relative to said housing member.

4. In an extension device of the character described, a housing member, a plurality of foldable members hingedly attached together and adapted to fold one upon the other, one of said foldable members having longitudinal edge portions in sliding engagement with said housing member, and held against separation therefrom, cooperating locking means on one of said foldable members and on said housing member, including a ratchet, said housing member locking means being mounted on a spring member secured adjacent one end of said housing member and extending longitudinally of said housing member adjacent said top wall and projecting from the other end of said housing, said spring member being adapted for limited movement toward said top wall against its own resiliency and permitting said foldable members to slide into said housing to a selective adjusted position, but preventing withdrawal of said foldable members from said housing except upon manual movement of said spring member toward said top wall to disengage said cooperating locking means.

5. In an extension device of the character described, a housing member comprising a top wall and side walls having infolded bottom edge portions, a plurality of foldable members hingedly attached together and adapted to fold one upon another, including a supporting member and an engaging member, said supporting member having longitudinal edge portions in sliding engagement with said infolded edge portions of said housing member, cooperating stop means on said housing member and said supporting member to prevent separation thereof, ratchet means on said engaging member comprising a series of apertures, a spring member mounted longitudinally of said housing member adjacent said top wall, and projecting from an end of said top wall, and adapted for limited movement towards said top wall, against the resiliency thereof, a pawl mounted on said spring member, said housing member slidably receiving said foldable members in folded position between said infolded edge portions and said spring member, with said pawl engaging said apertures, said pawl riding over said apertures against the resiliency of said spring spring member during shortening movement of said folded members, and engaging one of said apertures to prevent lengthening movement of said folded members except upon manual movement of said spring member towards said top wall to disengage said pawl from said engaged aperture.

NELS T. NELSON.